United States Patent [19]
Furuya et al.

[11] Patent Number: 5,242,738
[45] Date of Patent: Sep. 7, 1993

[54] SURFACE LAYER OF INTERIOR ARTICLE

[76] Inventors: Tamio Furuya, c/o Honda Engineering Co., Ltd., 10-1, Shin Sayama 1-chome, Sayama-shi, Saitama-ken; Noboru Matsuura, 717-5, Kizuki, Nakahara-ku, Kawasaki-shi, Kanagawa-ken, both of Japan

[21] Appl. No.: 985,365

[22] Filed: Dec. 3, 1992

Related U.S. Application Data

[63] Continuation of Ser. No. 775,158, Oct. 10, 1991, abandoned, which is a continuation of Ser. No. 660,241, Feb. 21, 1991, abandoned, which is a continuation of Ser. No. 298,184, Jan. 17, 1989, abandoned.

[30] Foreign Application Priority Data

Jan. 20, 1988 [JP] Japan .................................. 63-11495

[51] Int. Cl.⁵ ................................................ B32B 3/00
[52] U.S. Cl. ...................................... 428/172; 428/105; 428/141; 428/158; 428/161; 428/162; 428/163; 428/212; 428/217; 428/218

[58] Field of Search ............... 428/156, 172, 167, 174, 428/212, 218, 76, 95, 105, 141, 155, 158, 161, 162, 163

[56] References Cited

U.S. PATENT DOCUMENTS

| | | | |
|---|---|---|---|
| 4,303,695 | 12/1981 | McCann | 428/172 |
| 4,411,943 | 10/1983 | Akao | 428/161 |
| 4,610,902 | 9/1986 | Eastman | 428/57 |
| 4,769,278 | 9/1988 | Kamimura | 428/282 |
| 4,781,956 | 11/1988 | Zimmermann | 428/43 |

*Primary Examiner*—Donald J. Loney
*Attorney, Agent, or Firm*—Darby & Darby

[57] ABSTRACT

A surface layer of an interior article, comprising a surface layer body formed of a synthetic resin and endowed with high extensibility, and a surface skin formed on the surface layer body and having a softening temperature lower than that of the surface layer body, with an uneven pattern being formed on the surface skin. Because of its lower softening temperature, the surface skin is held in a softer condition during a forming operation, so it is possible to form a clear uneven pattern positively on the surface skin.

4 Claims, 2 Drawing Sheets

SURFACE LAYER OF INTERIOR ARTICLE

This is a continuation of application Ser. No. 07/775,158, filed Oct. 10, 1991, now abandoned, which is a continuation of Ser. No. 07/660,241, filed Feb. 21, 1991, now abandoned, which is a continuation of Ser. No. 07/298,184 filed Jan. 17, 1989, now abandoned.

BACKGROUND OF THE INVENTION

1. Field of the Invention:

The present invention relates to a surface layer of an interior article examples of which are the instrument panel, front and rear doors on both sides and the roof of an automobile.

2. Description of the Prior Art:

In a conventional interior material such as the instrument panel of an automobile, as shown in FIG. 5, a buffer layer 22 formed by a foam for example is bonded to the outer surface of a frame member 21, and a surface layer 23 formed of polyvinyl chloride resin and having a suitable hardness is bonded to the outer surface of the buffer layer 22. Further, on the surface of the surface layer 23 is formed a wrinkle pattern as an uneven pattern 24 expressing artificial leather cloth for imparting a soft feeling to the said surface.

In order to form the uneven pattern 24 on the surface of the surface layer 23, we have developed such a vacuum forming method as is disclosed in Japanese Patent Laid-Open No. 104848/86 wherein the uneven pattern 24 is formed simultaneously with a forming operation using a pattern die having a sheet lap surface formed with an uneven pattern corresponding to the uneven pattern 24 and also having innumerable, fine, continuous pores which are distributed uniformly throughout the whole of the said sheet lap surface. According to this method, a synthetic resin sheet with the buffer layer 22 bonded thereto is softened by heating at a high temperature beforehand onto the back of the surface layer 23, then the surface of the surface layer 23 is brought into close contact by suction with the pattern die positioned just thereabove to effect forming, whereby the uneven pattern 24 of the pattern die, e.g. a wrinkle pattern, is transferred onto the surface of the surface layer 23.

However, a portion of the surface layer 23, e.g. a bent portion, which is drawn out largely during the forming operation may be broken, or the uneven pattern 24 may become unclear due to variations in heating temperature for the synthetic resin sheet or due to drop in temperature of the synthetic resin sheet or variations in the said temperature drop during forming using the pattern die after the heating. And this tendency is more conspicuous in the drawn-out portion.

SUMMARY OF THE INVENTION

The present invention has been accomplished for solving the above-mentioned problems and it is the object thereof to prevent the surface layer from being broken during the forming operation and form an uneven pattern on the surface of the surface layer clearly and positively while maintaining the hardness of the same layer.

According to technical means adopted by the present invention for solving the foregoing problems, the surface of a surface layer body formed of a synthetic resin and endowed with high extensibility is coated with a surface skin having a softening temperature which is lower to an appropriate degree than that of the surface layer body, and an uneven pattern is formed on the surface skin.

According to the above means, since the surface layer body maintains the hardness of the surface layer and possesses high extensibility, the strength of the surface layer is maintained even at its portion which is drawn out during the forming operation; further, since the softening temperature of the surface skin formed on the outer surface of the surface layer body is lower to an appropriate degree than that of the surface layer body, the surface skin is held in a softer condition during, thereby permitting a positive transfer of a clear uneven pattern onto the surface layer.

DESCRIPTION OF A PREFERRED EMBODIMENT

An embodiment of the present invention will be described hereinunder with reference to the accompanying drawings.

Figure 1:
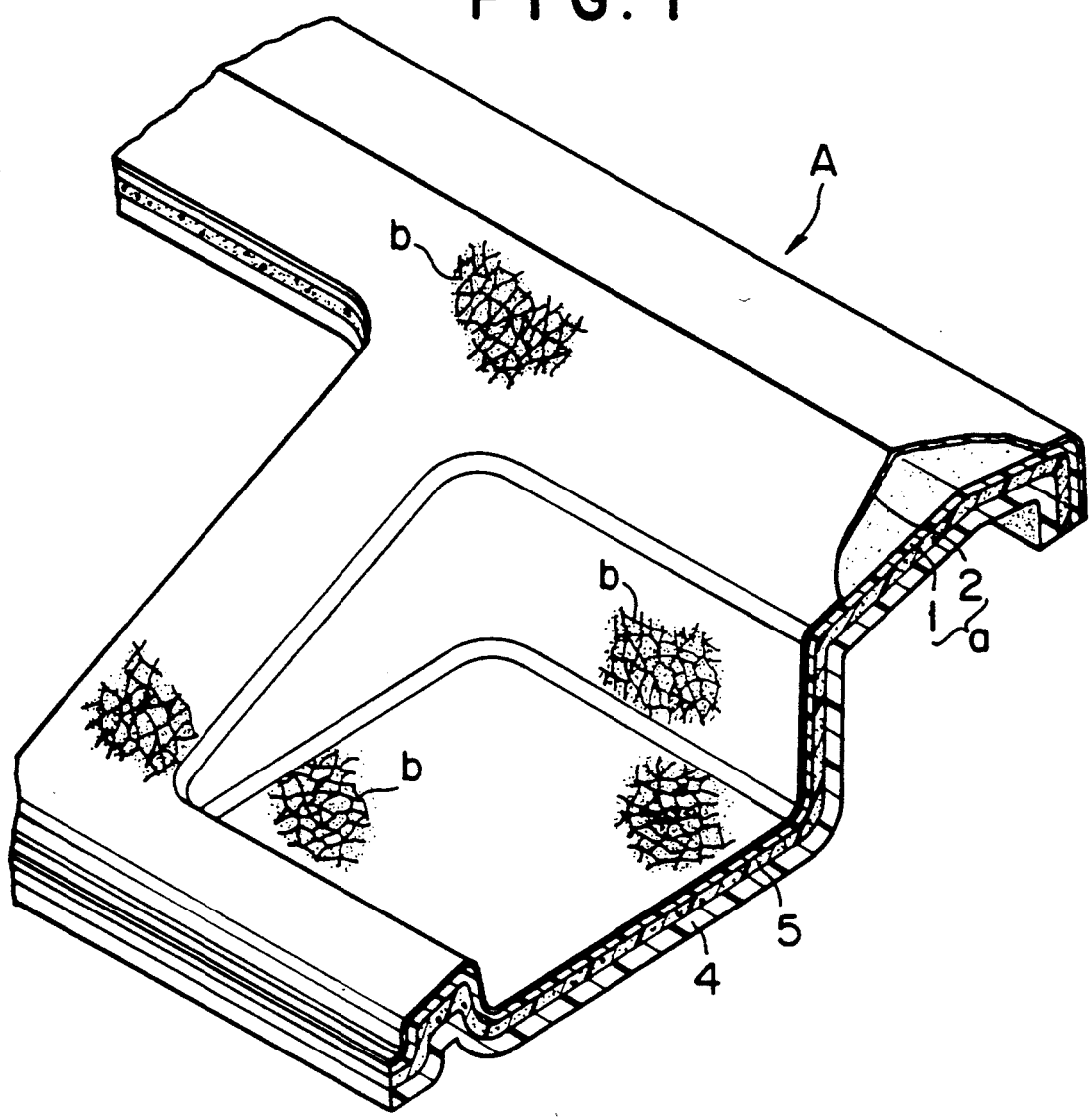
FIG. 1 is a partially omitted perspective view of an interior article.
Figure 2:
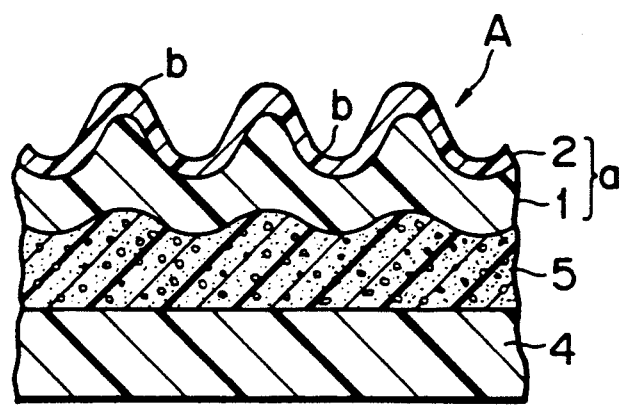
FIG. 2 is an enlarged sectional view thereof.

FIG. 1 shows an automobile instrument panel as an example of an interior article A. The interior article A comprises a frame member 4, a buffer layer 5 bonded to the outer surface of the frame member 4, and a surface layer, a, bonded to the outer surface of the buffer layer 5. The surface layer, a, is composed of two layers which are a surface layer body 1 and a surface skin 2. A complicated uneven pattern, b, such as a wrinkle pattern is clearly formed throughout the whole surface of the surface skin 2.

In the present invention, the uneven pattern, b, can be formed on the surface of the surface layer, a, simultaneously with forming of the interior article A by a vacuum forming method using a pattern die (not shown), the pattern die having a sheet lap surface of the same shape as the outer surface shape of the surface skin 2 and formed with an uneven pattern corresponding to the uneven pattern, b, and also having innumerable, fine, continuous pores distributed uniformly throughout the whole surface of the sheet lap surface, as explained above in the description of the prior art.

Figure 3:
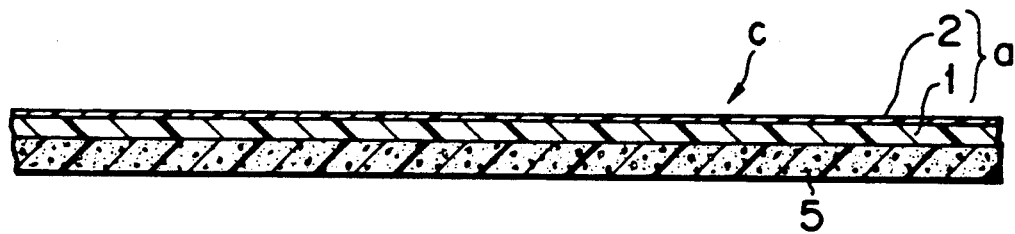
FIG. 3 is a sectional view of a synthetic resin sheet.
Figure 4:
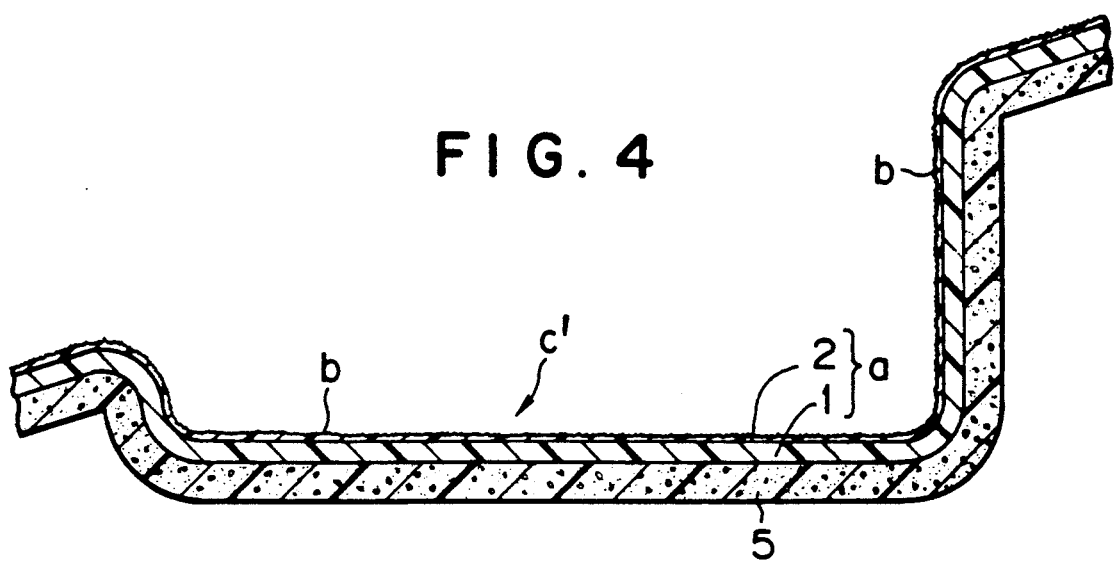
FIG. 4 is a sectional view of a formed part.
Figure 5:
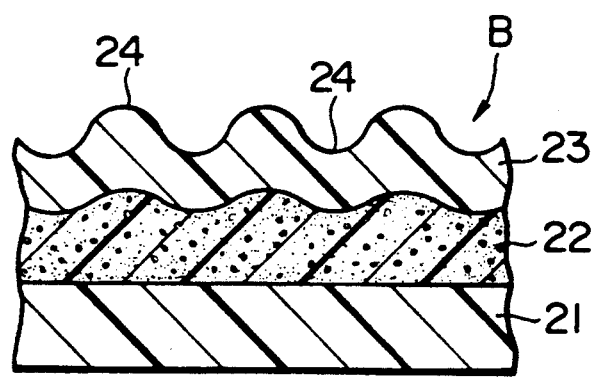
FIG. 5 is a sectional view showing a conventional example.

The frame member 4 may be bonded to the buffer layer 5 simultaneously with forming of the buffer layer and the surface layer, a. Or, as shown in FIG. 3, a synthetic resin sheet, c, comprising the buffer layer 5 and the surface layer, a, which have been bonded together may be formed into a predetermined shape together with the uneven pattern, b, separately from the frame member 4 to constitute a formed part, c', (see FIG. 4), and thereafter the frame member 4 may be bonded to the formed part, c', in another step. There may be adopted any other suitable method.

The frame member 4, having a layer which serves as a core of the interior article A, is formed into a predetermined shape using a material having appropriate strength and hardness such as ABS resin, rigid polyurethane resin, or polypropylene. To the outer surface of the frame member 4 is bonded the buffer layer 5 using an adhesive such as a hot-melt adhesive.

The buffer layer 5, which serves as a cushion, is obtained by foaming such a material as polypropylene or polyurethane resin at a suitable expansion ratio. To the outer surface of the buffer layer 5 is bonded the surface layer, a, using a suitable adhesive.

The surface layer, a, as noted previously, is composed of two layers which are the surface layer body 1 having a suitable hardness and the surface skin 2 formed on the outer surface of the surface layer body 1 and having the uneven pattern, b, formed using such a pattern die as referred to above.

The surface layer body 1 maintains the surface layer, a, at a predetermined hardness and it is endowed with high extensibility thereby permitting the surface layer, a, to be drawn out easily during the forming operation. The surface skin 2 is of a thin layer structure for forming an uneven pattern, b, of say 100μ or so in depth on the outer surface of the surface layer, a, and it has a softening temperature lower than that of the surface layer body 1.

In the combination of the surface layer body 1 and the surface skin 2, when both 1 and 2 mainly comprise the same chemical substance and this chemical substance is a polymer of a single compound, the polymer is prepared so that the degree of polymerization thereof is smaller in the surface skin 2 than in the surface layer body 1, whereby the softening temperature of the surface skin 2 is made smaller than that of the surface layer body 1.

For example, where both the surface layer body 1 and the surface skin 2 mainly comprise polyvinyl chloride, a polyvinyl chloride of a high polymerization degree of about 2,500 may be used for the surface layer body 1, while using a polyvinyl chloride of a low polymerization degree of about 800 for the surface skin 2. In this case, the amount of a plasticizer to be incorporated in the surface layer body 1 is suitably increased on the basis of a relatively high polymerization degree of a resin material to lower the softening temperature for making the surface layer body highly extensible while maintaining the required hardness. To assist maintaining the hardness and strength of the surface layer body 1, a synthetic resin, e.g. ABS resin, may be incorporated therein at a suitable proportion.

The following is an explanation about the method of forming the uneven pattern, b, on the surface skin 2 of the surface layer, a, using the material mentioned above.

The synthetic resin sheet, c, shown in FIG. 3 is suspended horizontally and heat-softened at approximately 185° C. The thus-softened sheet, c, is placed, with the surface layer, a, facing upwards, just under the sheet lap surface at the lower end of the foregoing pattern die (not shown) followed by vacuum suction to let the sheet, c, adhere strongly to the pattern die through the surface skin side 2. In this case, in order to improve the adhesion, a pressure die which is in a corresponding relation to the pattern die may be pressed against the sheet, c, from below the sheet. Upon release of the synthetic resin sheet, c, there is obtained a formed part, c′, having a clear and complicated uneven pattern, b, such as buffalo wrinkles which pattern was formed simultaneously with the forming operation.

The temperature of the synthetic resin sheet, c, which has been heated to approximately 185° C. lowers to 160° C. or so at the time of vacuum forming using the pattern die and further lowers to 70°–80° C. at the time of release. The said temperature (approx. 160° C.) in the vacuum forming operation is a material shaping temperature, at which temperature the surface layer body 1 is in a softened condition insufficient to form the uneven pattern, b, on it. However, since the surface skin 2 is in a sufficiently softened condition, a clear uneven pattern, b, can be formed positively on the surface of the surface layer, a.

The surface layer body 1 and the buffer layer 5 also play the role of preventing the synthetic resin sheet, c, from being softened too much and hanging down during heating of the sheet.

In the present invention, by suitably combining conditions such as the polymerization degrees of the components of the surface layer body 1 and the surface skin 2, the difference between both polymerization degrees and heating temperature for the synthetic resin sheet, c, the uneven pattern, b, can be formed on the surface of the surface layer, a, clearly and positively.

The interior article A is formed by a method wherein the frame member 4 preformed as shown in FIG. 1 is bonded to the formed part, c′, which has been obtained in the manner described previously, using a suitable adhesive in a separate step, or by a method wherein, in vacuum forming, the frame member 4 is fixed the foregoing pressure die (not shown) and is bonded to the synthetic resin sheet, c, during forming of the sheet, or by a method wherein the frame member 4 is formed by urethane foam on the back of the buffer layer 5 of the formed part, c′.

Where polyurethane is used in place of the polyvinyl chloride as a component of the surface layer, a, the kind and the degree of polymerization of isocyanate and polyol components of the polyurethane in the surface skin 2 and surface layer body 1, whereby the softening temperature of the surface skin 2 is made lower to an appropriate extent than that of the surface layer body 1.

In the combination of the surface layer body 1 and the surface skin 2, when both 1 and 2 mainly comprise the same chemical substance and this chemical substance is a copolymer of two or more kinds of monomer units, the proportions of the monomer units in the surface layer body 1 and that of the monomer units in the surface skin 2 are made different from each other, or the copolymer is prepared so as to be lower in molecular weight in the surface skin 2 than in the surface layer body 1, whereby the softening temperature of the surface skin 2 is made lower than that of the surface layer body 1. For example, a thermoplastic elastomer prepared by copolymerizing polypropylene as a base component with another compound is used and the proportion of monomer units of the polypropylene and that of the another compound are changed suitably between both 1 and 2, the said elastomer in the surface skin is made lower in molecular weight than the elastomer in the surface layer body 1, whereby the softening temperature of the surface skin 2 can be made lower than that of the surface layer body 1.

In the present invention, moreover, the surface layer body 1 and the surface skin 2 may be formed of different chemical substances to thereby render the softening temperature of the surface skin 2 lower than that of the surface layer body 1. Examples of the "different chemical substances" include the cases where the chemical substance as a main component is a polymer of a single monomer unit, a copolymer of plural monomer units, and a mixture of both, wherein the kind of monomer units and the number of such kind are made different from each other. For example, there may be adopted a combination of a polyvinyl chloride resin as the surface layer body 1 and a urethane-based thermoplastic elastomer as the surface skin 2.

Examples of the resin material which constitutes the surface layer, a, used in the present invention include polymers and copolymers of a crosslinked structure.

The chemical substances which may be used to constitute the surface skin and the surface layer body are not limited to those described in the above embodiment. Suitable combinations may be adopted. And the temperature and other forming conditions may be suitably selected accordingly.

In the present invention, the method of forming the uneven pattern on the surface skin is not limited to the one described in the above embodiment. The interior article is not limited to the one shown in FIG. 1. It may be the one shown in FIG. 4, or may be constituted by only the surface layer, a, comprising the surface layer body and the surface skin formed thereon.

Further, it is not always necessary that the interior article be of a three-dimensional structure having a bent portion. It may be of a flat shape like sheet. Moreover, the outer surface of the surface skin 2 may be surface-finished using a urethane resin or an acrylic resin.

The following are concrete working examples of the present invention and the results of evaluation of the resulting baffalo wrinkles-like uneven patterns. The evaluation of the uneven patterns will be made in comparison with the case where an uneven pattern is formed on a conventional material (comparative example).

| | | part by weight |
|---|---|---|
| Example ① | | |
| (1) Surface Skin | | |
| Composition: | Polyvinyl chloride resin (polymerization degree: 800) | 100 |
| | Trimellitic acid-based plasticizer | 64 |
| | Epoxy-based stabilizer | 8 |
| | Heat-and light-resisting stabilizer | 4 |
| | Pigment | 5 |
| Thickness: | 0.2 mm | |
| Bonding with surface layer body: | heat fusion | |
| (2) Surface Layer Body | | |
| Composition: | Polyvinyl chloride resin (polymerization degree: 2,500) | 70 |
| | High temp. elongation modifying resin | 30 |
| | Trimellitic acid-based plasticizer | 54 |
| | Epoxy-based stabilizer | 6 |
| | Heat-and light-resisting stabilizer | 4 |
| | Pigment | 5 |
| Thickness: | 0.6 mm | |
| Bonding with buffer layer: | a solvent type urethane-based adhesive | |
| (3) Buffer Layer | | |
| Material: | an electron beam-crosslinked polypropylene foam (expansion: 18X) | |
| Thickness: | 4 mm | |
| Comparative Example | | |
| (1) Surface Layer Body | | |
| Composition: | Polyvinyl chloride resin (polymerization degree: 1,200) | 75 |
| | High temp. elongation modifying resin | 25 |
| | Trimellitic acid-based plasticizer | 28 |
| | Epoxy-based stabilizer | 7 |
| | Heat-and light-resisting stabilizer | 4 |
| Thickness: | 0.6 mm | |
| Bonding with buffer layer: | a solvent type urethane-based adhesive | |
| (2) Buffer Layer | | |
| Material: | an electron beam-crosslinked polyurethane foam (expansion: 18X) | |
| Thickness: | 4 mm | |
| Example ② | | |
| (1) Surface Skin | | |
| Composition: | Olefinic thermoplastic elastomer (MFR = 20, Shore A = 63) | 100 |
| | Heat-and light-resisting stabilizer | 0.5 |
| | Pigment | 5 |
| (Note) MFR 230° C., 10 kg, g/10 min, JISK72010 | | |
| Thickness: | 0.1 mm | |
| Bonding with surface layer body: | heat fusion | |
| (2) Surface Layer Body | | |
| Composition: | Olefinic thermoplastic elastomer (MFR = 2, Shore A = 95) | 70 |
| | Polypropylene | 30 |
| | Heat-and light-resisting stabilizer | 0.5 |
| | Pigment | 5 |
| Thickness: | 0.2 mm | |
| Bonding with buffer layer: | heat fusion | |
| (3) Buffer Layer | | |
| Material: | an electron beam-crosslinked polyethylene foam (expansion: 30X) | |
| Thickness: | 2.5 mm | |
| Example ③ | | |
| (1) Surface Skin | | |
| Composition: | Polyether-based urethane thermoplastic elastomer (JIS hardness A = 80) | 100 |
| | Lubricant (polyethylene wax) | 1 |
| | Pigment | 2 |
| Thickness: | 0.2 mm | |
| Bonding with surface layer body: | heat fusion | |
| (2) Surface Layer Body | | |
| Composition: | Polyvinyl chloride resin (polymerization degree: 2,500) | 70 |
| | High temp. elongation modifying resin | 30 |
| | Trimellitic acid-based plasticizer | 54 |
| | Epoxy-based stabilizer | 6 |
| | Heat-and light-resisting stabilizer | 4 |
| | Pigment | 5 |
| Thickness: | 0.6 mm | |
| Bonding with buffer layer: | a solvent type urethane-based adhesive | |
| (3) Buffer Layer | | |
| Material: | an electron beam-crosslinked polypropylene foam (expansion: 18X) | |
| Thickness: | 4 mm | |

| Results of evaluation of uneven pattern transferability | | |
|---|---|---|
| Sheet Surface Temp. (*1) | Sheet Sample | Transferability of Uneven Pattern (*2) |
| 185° C. | Example ① | ◎ |
| | Example ② | ◎ |
| | Example ③ | ◎ |

-continued

| Sheet Surface Temp. | | part by weight |
|---|---|---|
| | Comparative Example | ○ |
| 175° C. | Example ① | ◉ |
| | Example ② | ◉ |
| | Example ③ | ◉ |
| | Comparative Example | ○ |
| 165° C. | Example ① | ○ |
| | Example ② | ○ |
| | Example ③ | ○ |
| | Comparative Example | △ |
| 155° C. | Example ① | ○ |
| | Example ② | ○ |
| | Example ③ | ○ |
| | Comparative Example | △ |

*1. Sheet Surface Temp.: Surface temperature just after heating of sheet
*2. Transferability of Uneven Pattern: Visual comparison about the depth and clearness of uneven pattern
(Superior) ◉ > ○ > △ (Inferior)

The above Examples ①–③ correspond to claims 2, 3 and 4, respectively.

From the results obtained above it can be said that all of the products (①–③) obtained according to the present invention are superior in the transferability of uneven pattern even in a low sheet surface temperature region as compared with the conventional products (Comparative Example).

Moreover, in the products according to the present invention, their uneven patterns are maintained over a long period and thus superior in shape retaining property.

According to our experiment there was obtained a result such that the surface layer body itself endowed with high extensibility according to the present invention was superior in the transferability of uneven pattern to the conventional surface layer body.

According to the present invention, as set forth hereinabove, since the basic structure of the surface layer is constituted by the surface layer body endowed with high extensibility, the surface layer can be prevented from being broken even at its portion to be drawn out at the time of forming operation; besides, since the softening temperature of the surface skin formed on the surface layer body is lower than that of the surface layer body, the surface skin is held in a softer condition during the forming operation, thereby permitting a clear uneven pattern to be transferred positively onto the surface skin.

Consequently, not only the surface layer can be prevented from being broken during the forming operation but also the transferability of uneven pattern on the surface of the surface layer can be improved by the surface skin thereby permitting an uneven pattern superior in shape retaining property to be formed on the surface of the surface layer clearly and positively while maintaining the conventional surface layer hardness. Thus, the desired object of the present invention can be attained.

What is claimed is:

1. A surface layer (a) of an interior material (A), including a synthetic resin sheet (c) comprising a surface layer (a) lined with a buffer layer (5), the surface layer (a) further comprising a surface layer body (1) and a surface skin (2), the surface layer (a) provided with uneven patterns (b) by integrally press-forming the surface layer (a) in the thermally softened state through a die having convex patterns to transcribe the uneven patterns (b) on the surface of the surface layer (a) from the die, consisting essentially of:
   a surface layer body (1) having a uniform core thickness and properties such as to maintain a necessary hardness as a surface layer and endowed with a high capability of film extension with a high degree of polymerization;
   a surface skin (2), heat fused to said surface layer body (1), having thin film thickness with properties such as to have a lower temperature of thermal softening than that of the surface layer body (1) and endowed with the high capability of transcribing the uneven patterns (b).

2. A surface layer of an interior article according to claim 1, wherein said surface layer body and said surface skin mainly comprise the same chemical substance, said chemical substance being a polymer of a single compound, the degree of polymerization or molecular weight of said polymer in said surface skin being smaller than that of the polymer in said surface layer body.

3. A surface layer of an interior article according to claim 1, wherein said surface layer body and said surface skin mainly comprise the same chemical substance, said chemical substance being a copolymer of plural monomer units, the proportions of the monomer units in the surface layer body and the proportions of the monomer units in the surface skin being different from each other, or the degree of polymerization of said copolymer in the surface skin being smaller than that of the copolymer in the surface layer body.

4. A surface layer of an interior article according to claim 1, wherein said surface layer body and said surface skin comprise chemical substances different from each other.

* * * * *